United States Patent [19]

Cucchi

[11] Patent Number: 4,700,593
[45] Date of Patent: Oct. 20, 1987

[54] GUIDE FOR USE IN THE FEEDING OF METAL BARS TO A MACHINE TOOL

[76] Inventor: Giovanni Cucchi, Via Genova, 4, 20060 Bussero (Milano), Italy

[21] Appl. No.: 891,830

[22] Filed: Aug. 1, 1986

[30] Foreign Application Priority Data

Aug. 30, 1985 [IT] Italy .............................. 22038 A/85
May 22, 1986 [IT] Italy ............................ 21934/86[U]

[51] Int. Cl.⁴ ............................................ B23B 13/04
[52] U.S. Cl. ..................................... 82/2.5; 82/2.7; 82/38 A
[58] Field of Search .............. 82/2.5, 2.7, 38 R, 38 A; 226/196, 199; 414/14, 15, 16, 17, 18, 745

[56] References Cited

U.S. PATENT DOCUMENTS

| | | | |
|---|---|---|---|
| 2,871,734 | 2/1959 | Fuchs et al. | 414/17 |
| 3,802,689 | 4/1974 | Doe | 82/2.7 |
| 3,874,519 | 4/1975 | Mikami | 82/2.7 |
| 4,088,230 | 5/1978 | Doe et al. | 82/2.7 |
| 4,292,864 | 10/1981 | Cucchi et al. | 82/2.7 |
| 4,604,924 | 8/1986 | Cucchi et al. | 82/2.7 |

FOREIGN PATENT DOCUMENTS 145668 6/1985 European Pat. Off. ............... 82/2.7
1212152 11/1970 United Kingdom ............... 82/38 A Primary Examiner—Nicholas P. Godici
Assistant Examiner—Jerry Kearns
Attorney, Agent, or Firm—Shlesinger, Fitzsimmons & Shlesinger

[57] ABSTRACT

A guide for use in feeding metal bars to a machine tool comprises a plurality of side-by-side units (11) mounted on a drum (21) and each consisting of two equal and substantially semi-circular parts (12, 13), fixed and movable respectively, provision also being made for control means operatively connected to the movable part (13).

The parts (12, 13) are each restrained at their own opposite ends, which are provided with stops, to respective rods (17) mounted on a bearing structure (18) fixed to the drum (21). Between the fixed and mobile parts there act one or more springs which thrust the movable part against the fixed part in the guide closure position.

13 Claims, 18 Drawing Figures

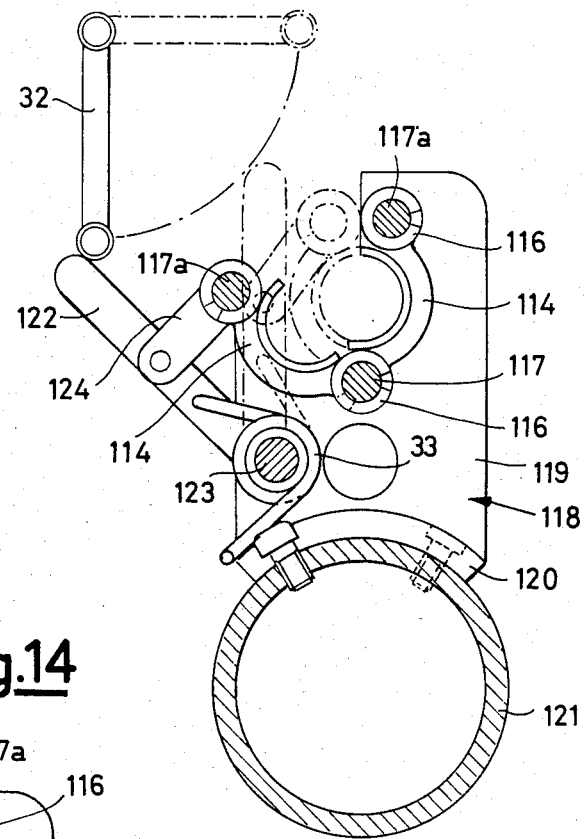
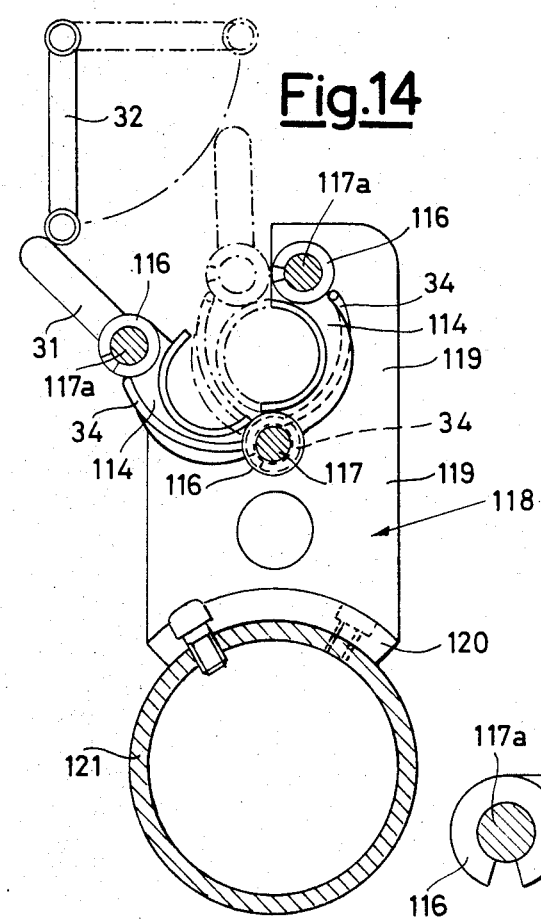
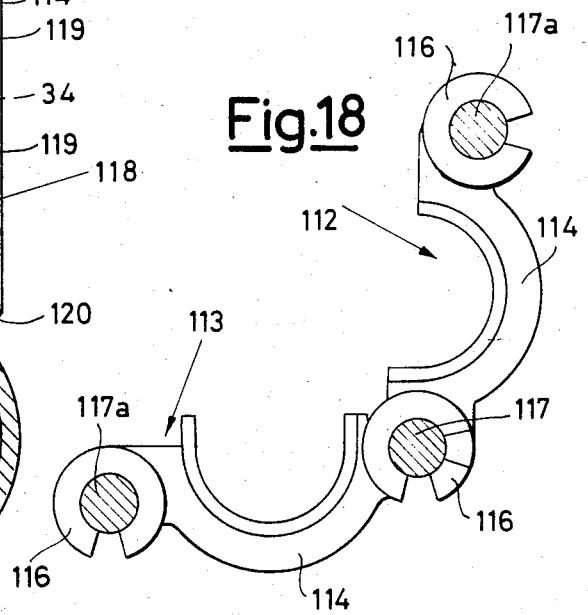

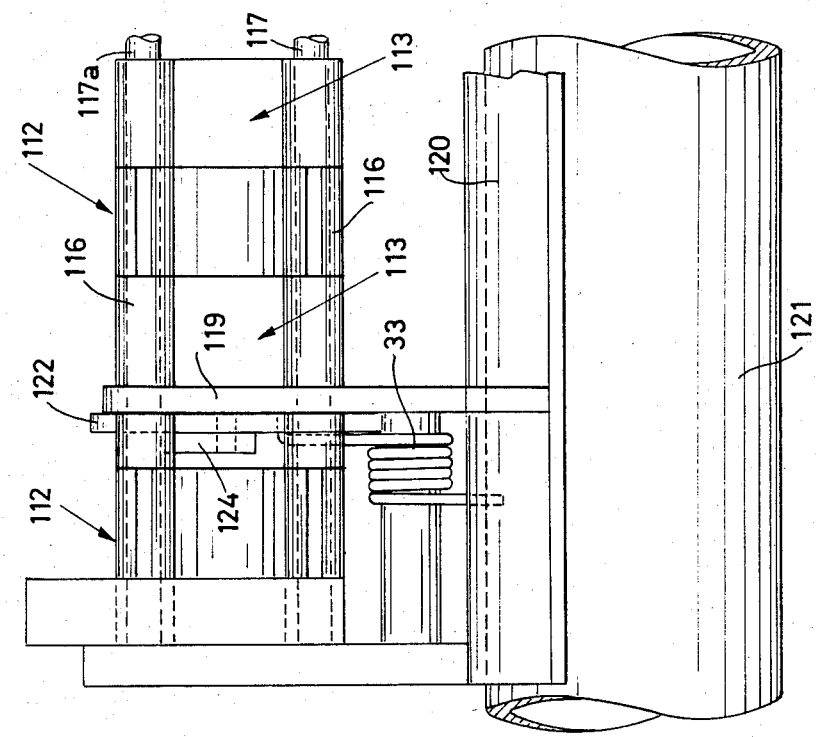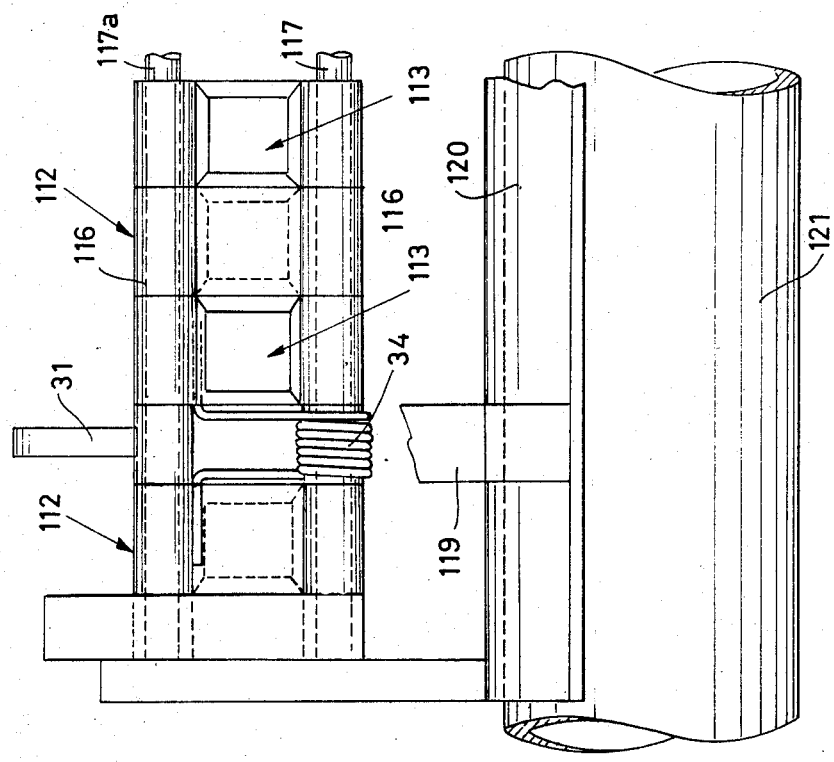

GUIDE FOR USE IN THE FEEDING OF METAL BARS TO A MACHINE TOOL

The present invention relates to an improved guide for use in the feeding of metal bars to a machine tool, for example a multi-spindle lathe.

Apparatus are known for feeding metal bars to a multi-spindle lathe in which the bar is placed within a guide and step-wise impelled into the lathe by a bar-pusher device.

Such apparatus comprise a plurality of guides mounted radially on a drum which can be controlled to rotate stepwise about its own longitudinal axis.

This ensures a continuous supply of bars to each spindle of the lathe.

To permit the bars to be placed within the guides without taking up too much space in so doing, it is known to embody each guide as several units disposed in side-by-side arrangement, each unit comprising two separable parts which are restrained radially in overhung fashion to the drum of the apparatus.

A guide of this type is for example described and illustrated in U.S. Pat. No. 4,604,924, which corresponds to the Italian patent application No. 21988 A/83 filed on July 8, 1983 in the name of F.lli Cucchi S.r.l.

The metal bar rotates, even at relatively high speeds, in a manner not wholly axial to the guide, and as a result very severe stresses are transmitted to the aforesaid parts composing the guide, which are supported only proximally to the overhung fast-ends securing them to the rotating drum. This means that oversize fixing buckles, which are both expensive and bulky, have to be employed since otherwise parts of the guides would frequently come away from the drum with all the obvious undesired effects that this would cause.

The overall object of the present invention is to embody a guide which, although of small bulk and economical to manufacture, will satisfactorily bear the stresses transmitted by the bar being turned on the lathe.

To attain this object, the invention provides a guide for the feeding of metal bars to a machine tool comprising a plurality of side-by-side units (11) mounted on a drum (21) and each consisting of two equal and substantially semi-circular parts (12, 13), fixed and movable respectively, provision also being made for control means operatively connected to the movable part (13) and wherein the parts (12, 13) are each supported at their own opposed ends, by restraining means, to respective rods (17) mounted on interspaced supports (18) fixed to the drum (21).

The restraining means includes bushes (16) through which the rods (17) pass freely.

The bushes (16) can be closed and formed enbloc from a box-shaped metal body (14) housing a core (15) constructed from cushioning material, or can be open and formed enbloc from a body made of plastic or metal.

According to another form of embodiment of the guide, instead of being opposed one with respect to the other the substantially semi-circular parts thereof can be placed in a staggered relation. This arrangement brings a twofold advantage: in the first place it decreases the friction surface in contact with the bar, which therefore rotates with less flutter and less noise; and in the second place the staggered semi-circular parts can be mounted on only three rods instead of four, in that the movable parts can be connected to the same innermost rod that carries the fixed parts of the guide.

A second technical problem arising with a guide as described above relates to embodying a satisfactory opening and closing device that will actuate the movable part, which must first be distanced from the fixed part so as to form a longitudinal opening for the loading of the bar, and then brought back against the fixed part so as to allow the bar to be held while the machine tool processes it.

A known control device for the movable part of the bar guide is for example described and illustrated in the above-noted U.S. Pat. No. 4,604,924. In brief, the said device comprises an actuator which, through the intermediary of a linkage, controls the opening and closing of the movable part of the guide. A bolt locking the mobile part of the guide in a closed position cooperates with the actuator. As well as being bulky and costly, such a device requires much time for operation, in that the bolt must each time be withdrawn and then shot again.

Another object of the present invention is to obviate the drawbacks of the known art by embodying a device that will control the opening and closing of the guide and at the same time is very simple in structure and functional in use.

To attain this object, the invention embodies a device in which provision is made between the fixed and movable parts of the guide for at least a return spring to keep the guide closed.

The return spring can be provided either directly between the fixed and movable parts or on the linkage by means of which an actuator device controls the movements of the movable part of the guide between the open and closed positions, and vice-versa.

The structural and functional characteristics of the invention, and its advantages over the known art, will become more apparent from an examination of the following description, referred to the appended drawings which show examples of slide guides embodied according to the present invention.

In the drawings:

FIGS. 13 and 14 show the guide apparatus in the open and closed positions, the closed position being indicated by dashed and dotted lines;

Figure 11:
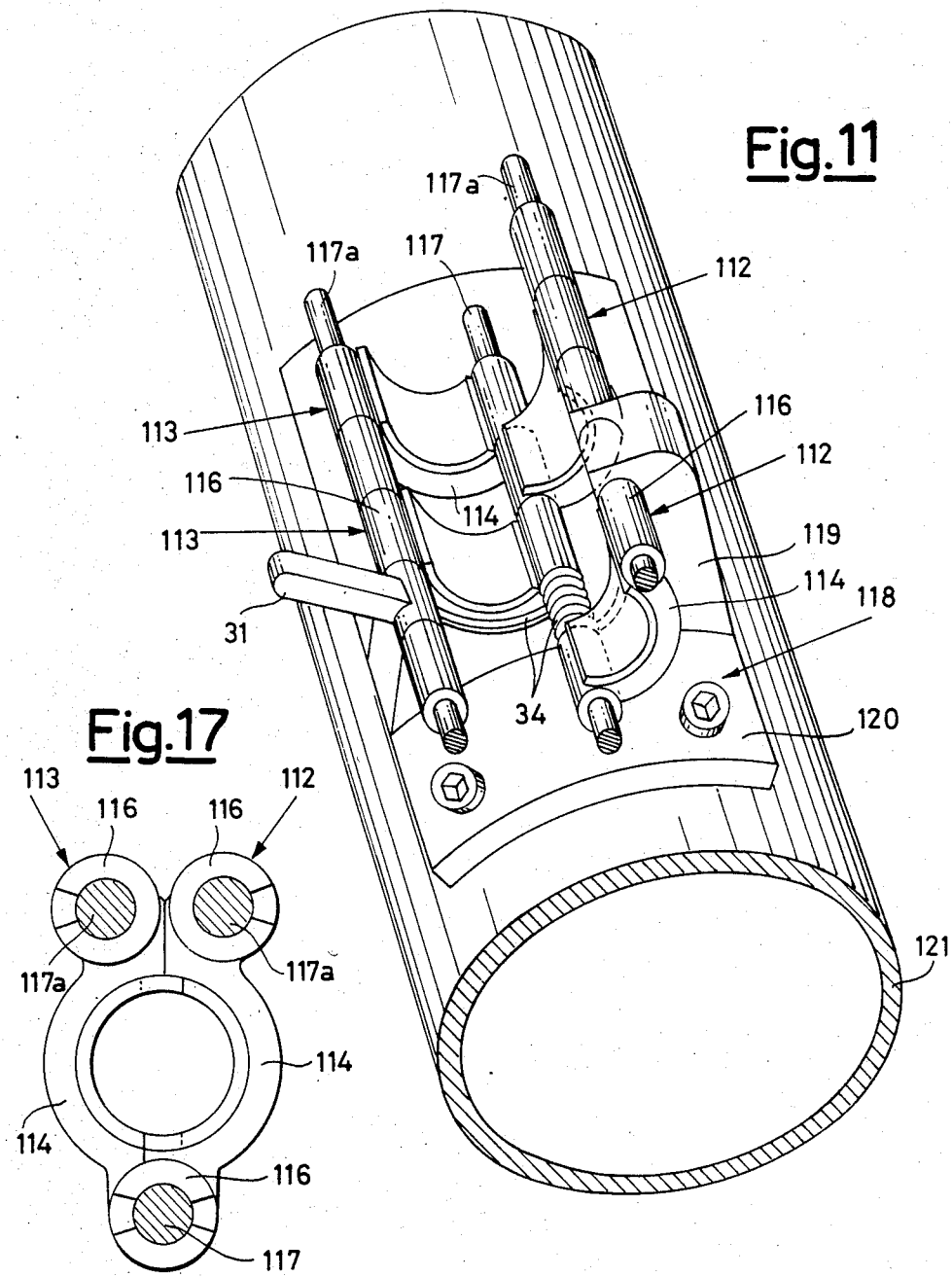
FIGS. 11 and 12 are two perspective views illustrating two further forms of embodiment of a guide apparatus according to the invention in the open position.
Figure 12:
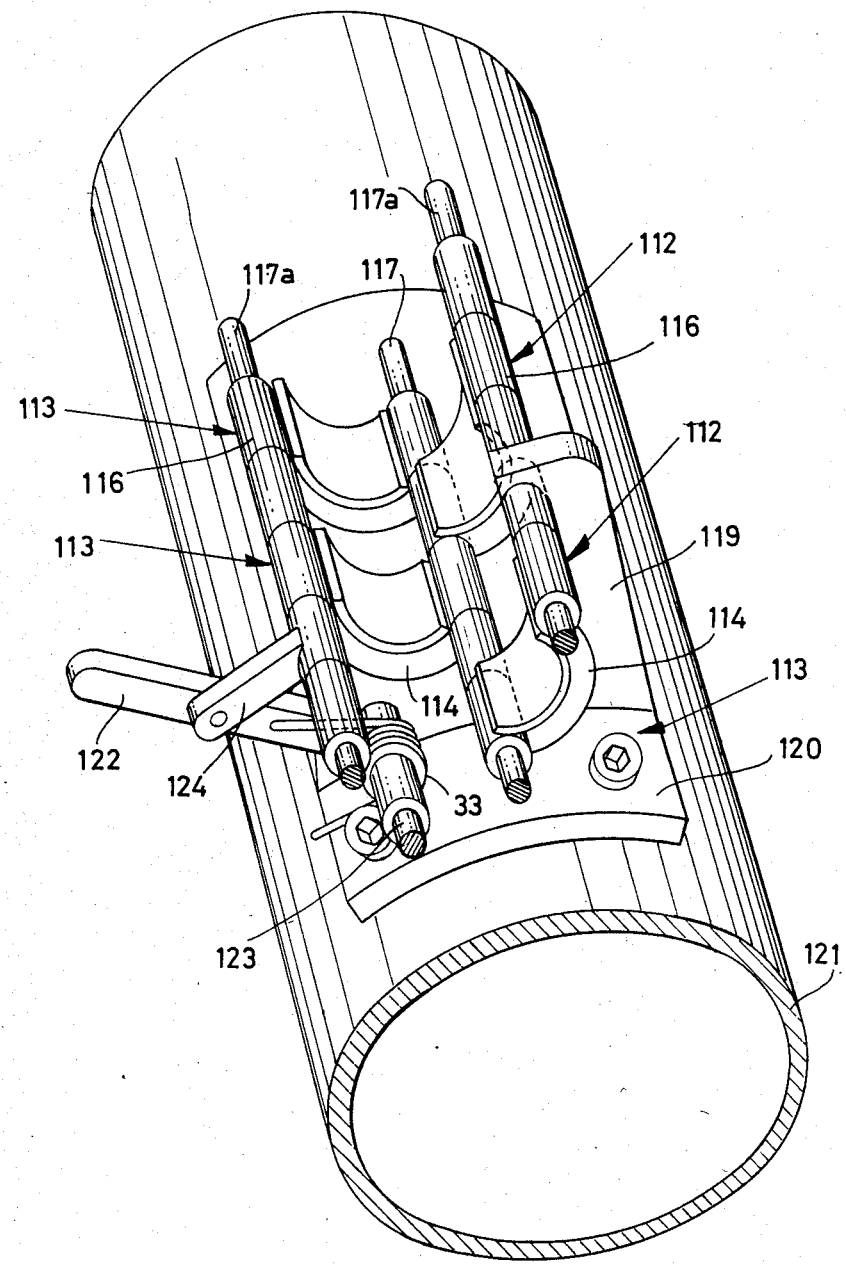

FIGS. 15 and 16 are two elevations, of the apparatus shown in FIGS. 13 and 14 respectively; and FIGS. 17 and 18 are two elevations showing the single parts composing the guide in FIGS. 11 and 12 in the closed and open position respectively.

In FIGS. 1–10 of the drawings, the numeral 10 indicates overall a guide embodied according to the invention and intended to accept a metal bar (not shown) to be fed to a machine tool, for example a multi-spindle lathe.

Figure 1:
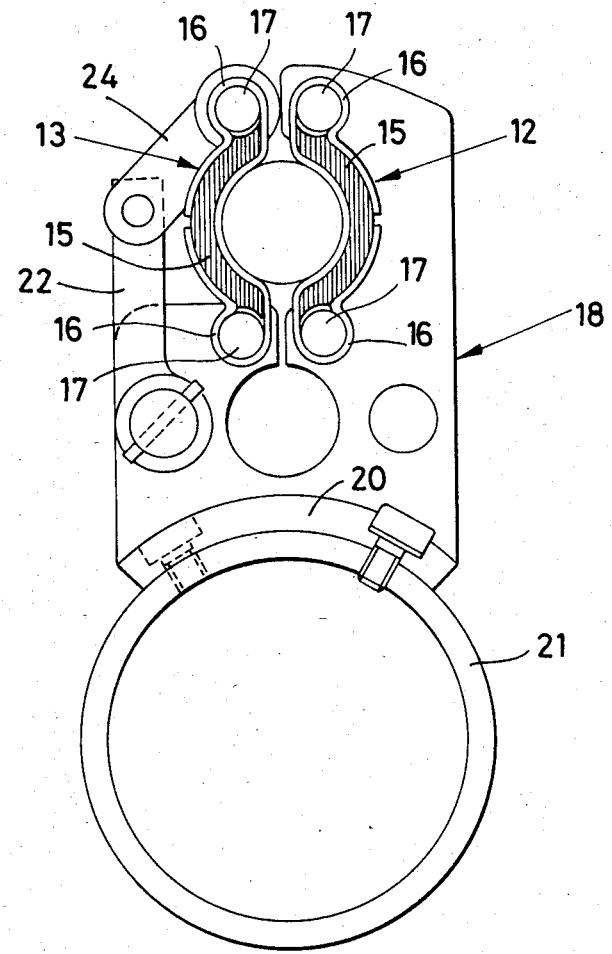
FIG. 1 is a vertical cross section illustrating the guide in the closed position.
Figure 2:
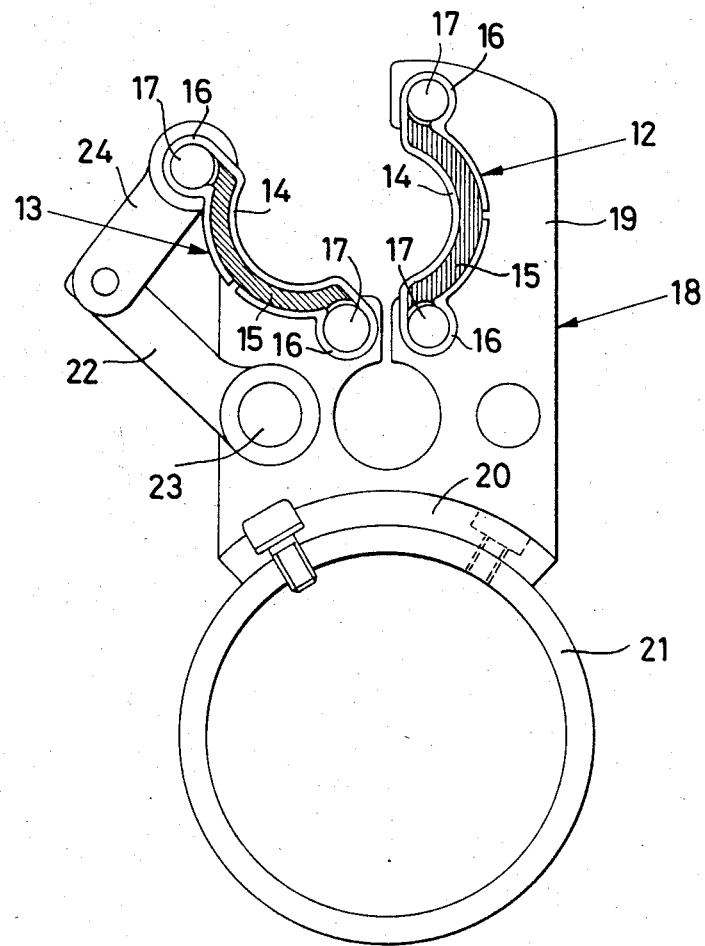
FIG. 2 is a section as in FIG. 1 illustrating the same guide in the open position.
Figure 3:
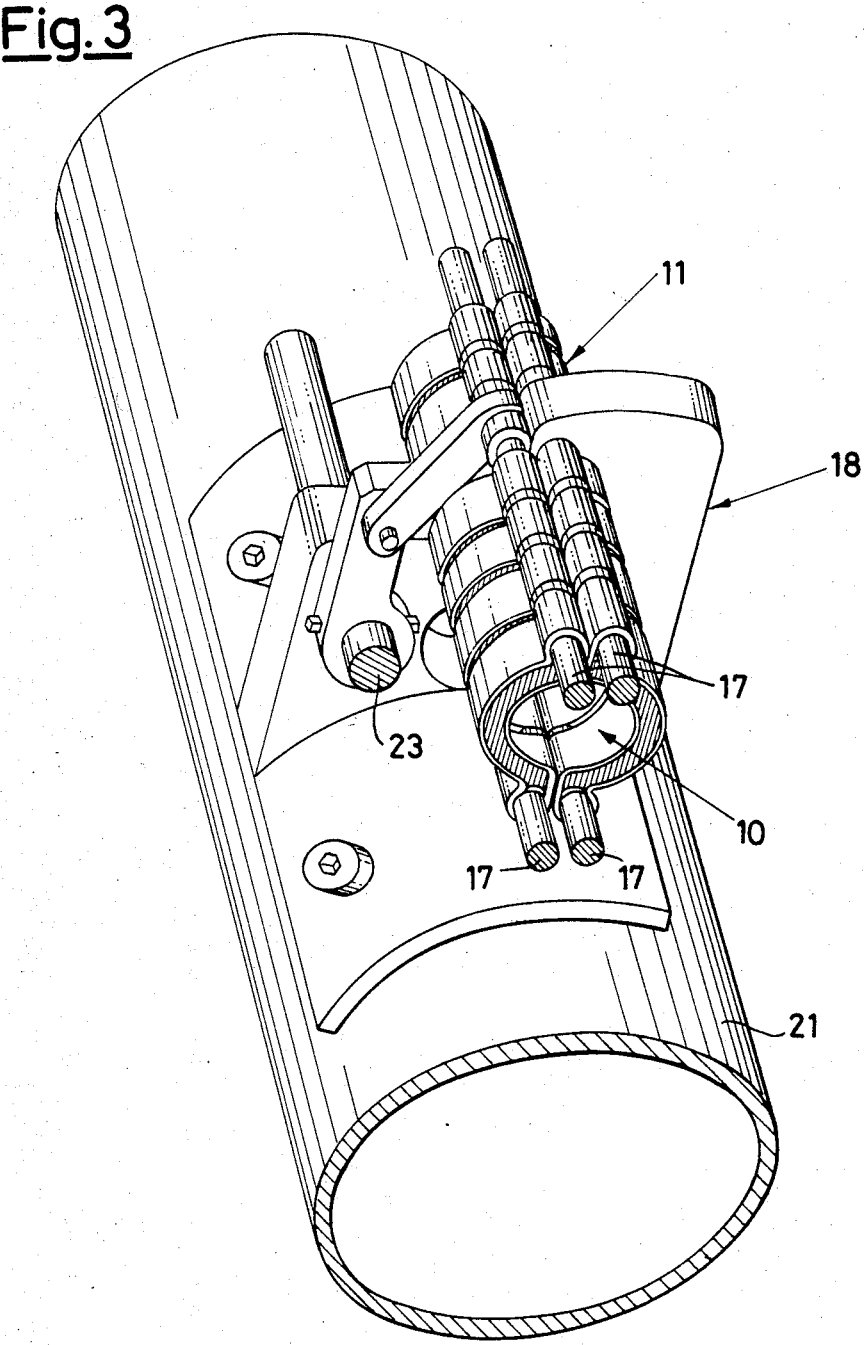
FIG. 3 is a perspective view of the guide in the closed position.
Figure 4:
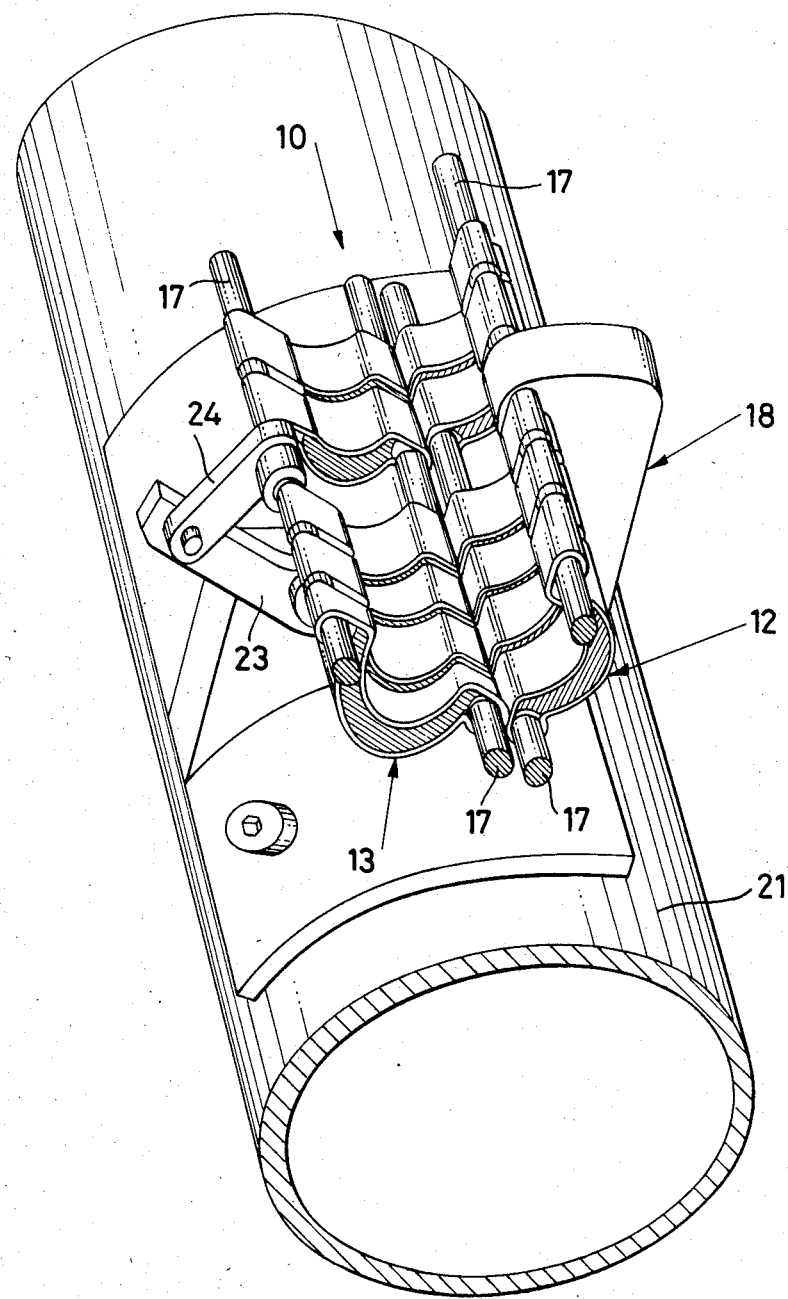
FIG. 4 is a view as in FIG. 3 of the guide in the open position.

As the figures clearly show, the guide 10 has a composite structure consisting of a plurality of side-by-side units 11 (FIGS. 3 and 4) each of which comprises two equal and substantially semi-circular parts 12, 13 which are fixed and movable respectively (FIGS. 1 and 2).

The parts 12, 13 are composed of an enveloping metallic box-shaped outer body 14 and a core 15 made of cushioning material, for example rubber.

At its opposite ends the box-shaped body is so shaped as to form bushes 16 through which there can freely pass respective support rods 17 forming part of a bearing structure indicated overall by 18.

The bearing structure 18 comprises a plate 19 fixed radially by flanges 20 to a drum 21. As is known to persons having ordinary skill in the art, the drum 21 is intended to carry a plurality of guides for bars and is controlled to rotate step-wise about its longitudinal axis so as to bring each bar in succession into a position of approach to a spindle of the lathe, the actual feeding being performed by a bar-pusher device, which can be of known type and is therefore not shown.

For the support of each guide 10, provision is made for a plurality of bearing structures 18 duly interspaced along the drum 21, and each structure 18 also comprises a linkage for actuating the movable part 13. The linkage consists of a connecting rod 22 secured at one end to a control rotating bar 23 and connected in an articulated manner at its opposite end to the radially external rod 17 of the mobile part 13 through the intermediary of a link 24.

In this manner the movable parts can be rotated about their radially internal rod 17 between the positions shown in FIGS. 1 and 2 (3 and 4) of the drawings, which positions are respectively the guide 10 closed and opened positions.

It will therefore be evident that, in a guide embodied according to the invention, the parts 12 and 13, restrained as they are at both the ends to the respective rods 17, are able to bear for a longer period of time and with no risk of breakage severe stresses transmitted by the bar rotating at relatively high speed within them.

Supported by the plates 19 at intermediate points along their lengths, the rods 17 have, between one support 19 and the next, the flexibility requisite to damp satisfactorily the vibrations and flutter caused by the rotation of the bar, which can be of various section.

The box-shape form with cushioning core of each of the parts 12, 13 forming a unit 11, is here illustrated for exemplifying purposes and is not limiting, and other embodiments such as those shown in FIGS. 5–10 can also be used.

Figure 5:
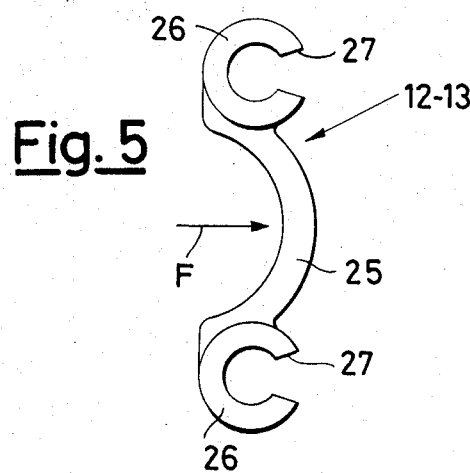
FIG. 5 is a view illustrating another possible form of embodiment of the parts adapted to form the guide of the invention.
Figure 6:
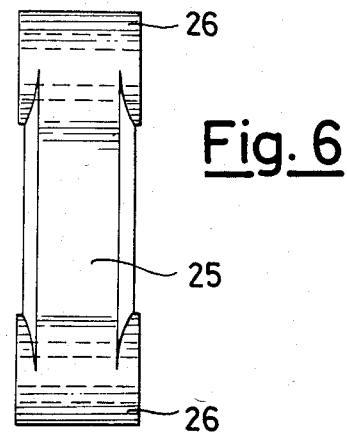
FIG. 6 is a view taken on the arrow F in FIG. 5.

FIGS. 5 and 6 illustrate a part 12, 13 in an enbloc piece 25 formed from moulded plastics material (filled Nylon) and with terminal bushes 26 open at 27 for snap-fit application to the rods 17, made possible by the relative elasticity of the material and allowing ready substitution of the piece 25.

Figure 7:
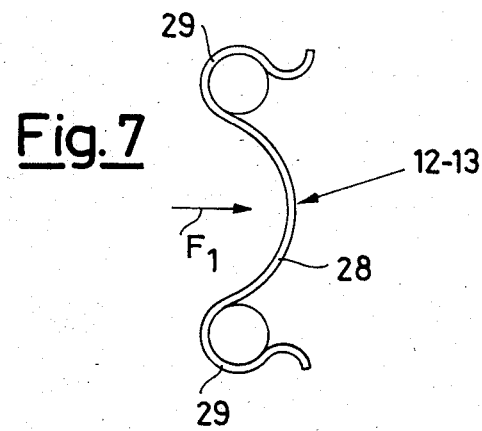
FIG. 7 is a view illustrating a further possible form of embodiment of the parts adapted to form the guide of the invention.
Figure 8:
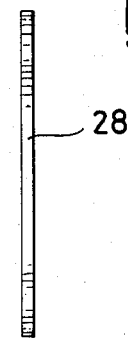
FIG. 8 is a view taken on the arrow F1 in FIG. 7.

FIGS. 7 and 8 illustrate a part 12, 13 consisting of a single resilient steel wire 28 shaped with open terminal bushes 29 for snap-fit application to the rods 17.

Figure 9:
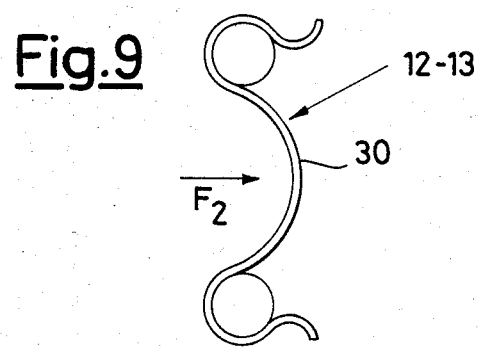
FIG. 9 is a view again illustrating another possible form of embodiment of the parts adapted to form the guide of the invention.
Figure 10:
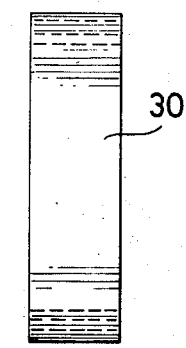
FIG. 10 is a view taken on the arrow F2 of FIG. 9.

FIGS. 9 and 10 show an embodiment equivalent to that in FIGS. 7, 8 in which the wire 28 is replaced by a lamina 30.

The guide apparatus shown in FIGS. 11–18 comprises a plurality of substantially semi-circular parts 112, 113, which are fixed and movable respectively.

Each of the parts 112 and 113 comprises a body 114, which can optionally be made entirely of suitable plastics material, shaped at its opposite ends so as to form bushes 116 through which there freely pass respective support rods 117, 117a forming part of a bearing structure indicated overall by 118.

The bearing structure 118 comprises a plate 119 fixed radially by flanges 120 to a drum 121. As is known to persons with ordinary skill in the art, the drum 121 is intended to carry a plurality of guides for bars and is controlled to rotate step-wise about its longitudinal axis so as to bring each bar in succession into a position of approach to a spindle of a lathe, the actual feeding of the bars being performed by a bar-pusher device which can be of known type and is therefore not shown.

To support each guide, provision is made for a plurality of bearing structures 118, duly interspaced along the drum 121.

According to one characteristic of the present invention, the parts 112, 113, fixed and movable respectively, are disposed staggered one with respect to the next, for which reason a single radially internal rod 117 and a pair of radially external roads 117a are sufficient to restrain the entire apparatus to the guide.

In a manner per se known, each structure 118 can comprise a linkage for actuating the movable part 113, the linkage consisting of a connecting rod 122 solid at one end with a control rotating bar 123 and connected in an articulated manner at its opposite end to the radially external rod 117a of the movable part 113 by a link 124 (FIG. 13).

Alternatively, a control arm 31 (FIG. 11) can be fixed directly to the radially outermost rod 117a of the movable part of the guide. An actuator device shown diagramatically by 32 comes to bear on the free end of the connecting rod 122 (FIG. 13), or on the free end of the arm 31 (FIG. 14) so as to control the shifting of the movable part 113 into the guide opening position against the action of a return spring 33, 34, which is a further characteristic of the present invention.

In the embodiment of FIGS. 12 and 13, the spring 33 is wound on the control rod 123 and its end portions act respectively on the connecting rod 122 and the fixed structure 118.

In the alternative embodiment of FIGS. 11 and 14, the spring 34 acts directly between the fixed part 112 and the movable part 113 of the guide, being wound directly on the rod 117.

As well as permitting the use of only three mounting bars, the staggered disposition of the fixed parts 112 and movable parts 113 forms a guide with minimal friction surface, which fact appreciably reduces the flutter, and thus noise, of the bar being processed.

FIGS. 17 and 18 of the drawings show in greater detail how the single elements forming the fixed and movable parts 112, 113 have to be embodied for them to be able to have the staggered disposition described heretofore with reference to the other Figures.

In particular, in each element the bushes 116 adapted to accept the support rods 117, 117a will prove staggered, and the arcuate configuration of the body 114 will be such that two successive opposed staggered elements will form the perfectly circular section shown in FIG. 17. This obviates flutter caused by the breaks present in guides formed from pairs of mutually opposed elements. In addition, the staggered disposition of the said elements or semi-circular parts permits rapid interchangeability of such elements with others, in relation to the diameter of the bar to be processed.

I claim:

1. A guide for use in a machine tool bar feeding mechanism of the type having a drum and a plurality of axially spaced bearing structures secured on said drum, comprising a plurality of rods supported intermediate their ends on said structures parallel to the axis of said drum, a plurality of side-by-side units mounted on said drum and each consisting of two equal and substantially semi-circular parts, one part of each of said units being fixed and the other being movable relative to said drum, control means connected to the movable part of each of said units and operable selectively to grip a metal bar in said units, and means connecting the opposite ends of each of said parts to a pair of said parallel rods that are held by said structures in predetermined spaced relation to each other, thereby to restrain movement of said opposite ends toward each other.

2. A guide as described in claim 1, wherein the said connecting means consist of bushes through which there freely pass said pair of rods.

3. A guide as described in claim 2, wherein the bushes are closed and formed enbloc from a box-shaped metallic body within which a core made of cushioning material is housed.

4. A guide as described in claim 2, wherein the bushes are open and are formed enbloc from a body made of plastics material.

5. A guide as described in claim 2, wherein the bushes are open and are formed enbloc from resilient metal wire.

6. A guide as described in claim 2, wherein the bushes are open and are formed enbloc to provide a resilient metal lamina.

7. A guide as described in claim 1, wherein one rod of the pair of rods supporting said movable parts is mounted to pivot about the other rod of said pair, said control means comprises a rotating control bar supported on said bearing structures, and a connecting arm is secured at one end to said control bar and is connected at its opposite end in an articulated manner through the intermediary of a link to said one rod of said pair whereby the movable parts can thus be pivoted about the other rod of said pair.

8. A guide apparatus for use in the feeding of metal bars to a machine tool, comprising a drum, a bearing structure fixed on said drum and supporting thereon at least three parallel rods, a plurality of substantially semicircular, alternating fixed and movable parts, respectively, mounted on said drum, and means connecting the parts each at one end in staggered relation one with respect to the next to a single one of said three rods, and connecting the opposite ends of adjacent ones of said parts each to a different one of the others of said three rods.

9. An apparatus as described in claim 8, wherein the connecting means are provided at the opposite ends of each of the parts and are staggered one with respect to the next.

10. An apparatus as described in claim 9, wherein said movable parts are movable into and out of guide closure positions in which they are disposed in an opposed and staggered relation to said fixed parts, and the substantially semi-circular parts are so shaped as to form therebetween, when disposed in said opposed and staggered manner, a corridor perfectly circular cross section.

11. A guide apparatus as described in claim 10, wherein between the fixed parts and the movable parts there act one or more springs which thrust the movable parts agains the fixed parts and into their guide closure positions.

12. An apparatus as described in claim 11, wherein the springs act between the bearing structure and a linkage which actuates the movable parts.

13. An apparatus as described in claim 11, wherein the springs act directly between the fixed and movable parts.

* * * * *